United States Patent [19]
Nyce et al.

[11] Patent Number: 5,952,823
[45] Date of Patent: Sep. 14, 1999

[54] MAGNETOSTRICTIVE LINEAR DISPLACEMENT TRANSDUCER FOR A SHOCK ABSORBER

[75] Inventors: David S. Nyce, Apex; Stephen W. Smith; Arnold F. Sprecher, Jr., both of Raleigh; Mauro G. Togneri, Cary; Peter T. Tola, Jr., Raleigh, all of N.C.

[73] Assignee: MTS Systems Corporation, Eden Prairie, Minn.

[21] Appl. No.: 08/828,193

[22] Filed: Mar. 21, 1997

Related U.S. Application Data

[60] Provisional application No. 60/013,985, Mar. 22, 1996.

[51] Int. Cl.$^6$ .............................. G01B 7/14; G01B 7/26; F01B 31/12; H04B 11/00
[52] U.S. Cl. ...................................... 324/207.13; 324/226
[58] Field of Search ............................... 324/207.13, 235, 324/226; 73/290 U, 313, 314, 319, 862.333; 333/148, 149; 310/333

[56] References Cited

U.S. PATENT DOCUMENTS

| | | | |
|---|---|---|---|
| 4,140,044 | 2/1979 | Biller et al. | 92/5 R |
| 4,455,555 | 6/1984 | Symonds et al. | 340/870 |
| 4,502,006 | 2/1985 | Goodwin et al. | 324/208 |
| 4,638,670 | 1/1987 | Moser | 73/658 |
| 4,883,150 | 11/1989 | Arai | 188/289 |
| 5,136,884 | 8/1992 | Lovett | 73/313 |
| 5,150,049 | 9/1992 | Schuetz | 324/207.12 |
| 5,233,293 | 8/1993 | Huang et al. | 324/207.15 |
| 5,313,160 | 5/1994 | Gloden et al. | 324/207.13 |
| 5,477,771 | 12/1995 | Black | 92/5 R |

FOREIGN PATENT DOCUMENTS 636161  2/1962  Canada .

OTHER PUBLICATIONS

Catalog: Temposonics™–Linear Displacement Transducers "Linear displacement transducers for absolute noncontact position sensing", MTS Systems Corporation, Eden Prairie, MN, 1988.

T. Lynch, Editor, "Non–contacting Sensor Handles Demands of Road Sensing Suspension", *Design News*, Feb. 22, 1993, pp. 150–151.

Brochure: "Temposonics II: The highly repeatable position sensor, proven reliable in the most demanding factory settings" MTS Systems Corporation, Eden Prairie, MN, 1995.

Brochure: "Temposonics–Product Line Overview", MTS Systems Corporation, Eden Prairie, MN, 1995.

*Primary Examiner*—Walter E. Snow
*Attorney, Agent, or Firm*—Westman, Champlin & Kelly, P.A.; S. Koehler

[57] ABSTRACT

A shock absorber includes a housing having a chamber and a piston slidably disposed in the chamber. A piston rod is connected to the piston and extends out of the housing. The piston rod includes a bore extending longitudinally therein. A magnetostrictive transducer provides an output signal indicative of the piston with respect to the housing. The magnetostrictive transducer includes a magnetostrictive waveguide disposed in the bore and a magnet joined to the housing that is operably coupled to the magnetostrictive waveguide.

25 Claims, 7 Drawing Sheets

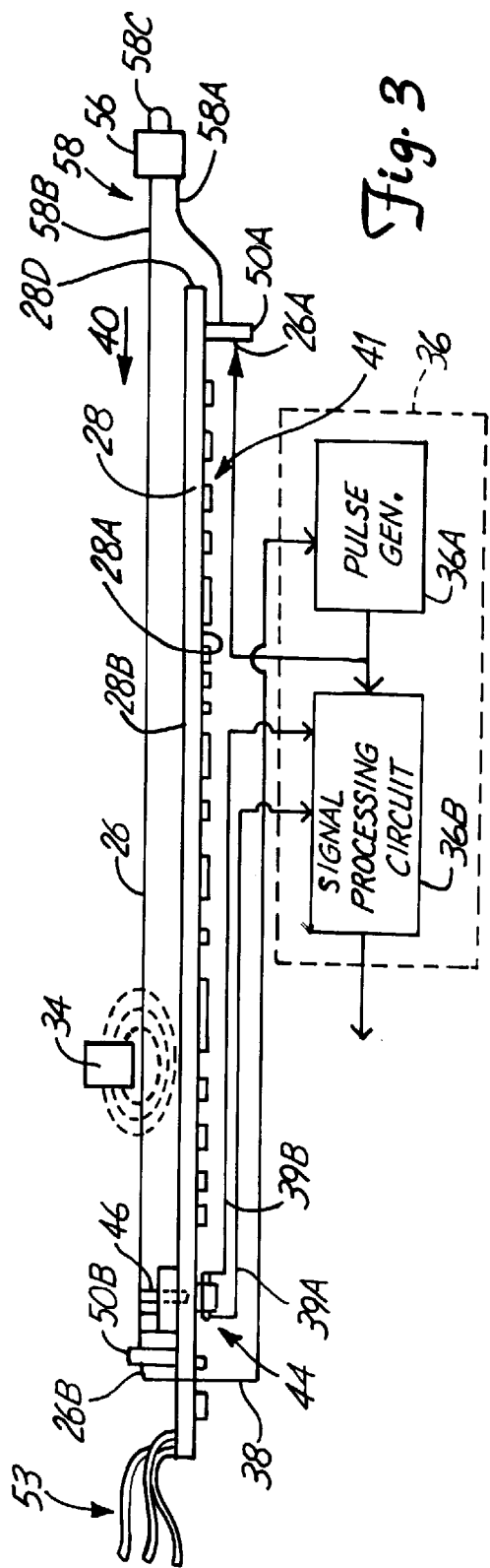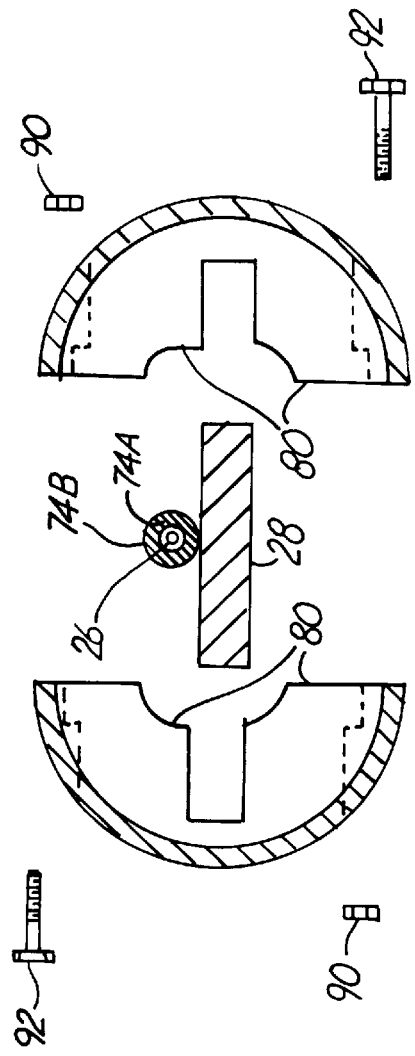

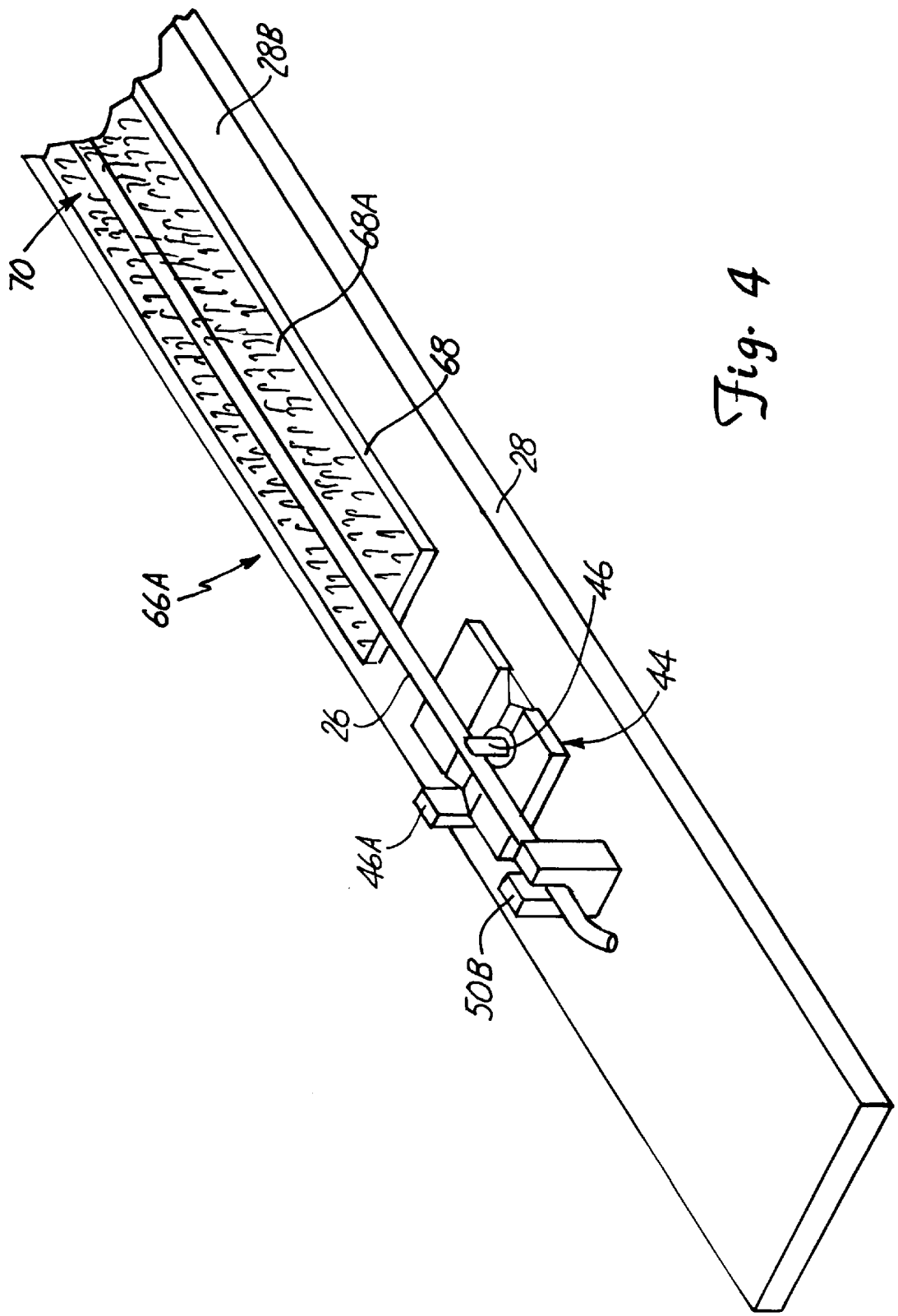

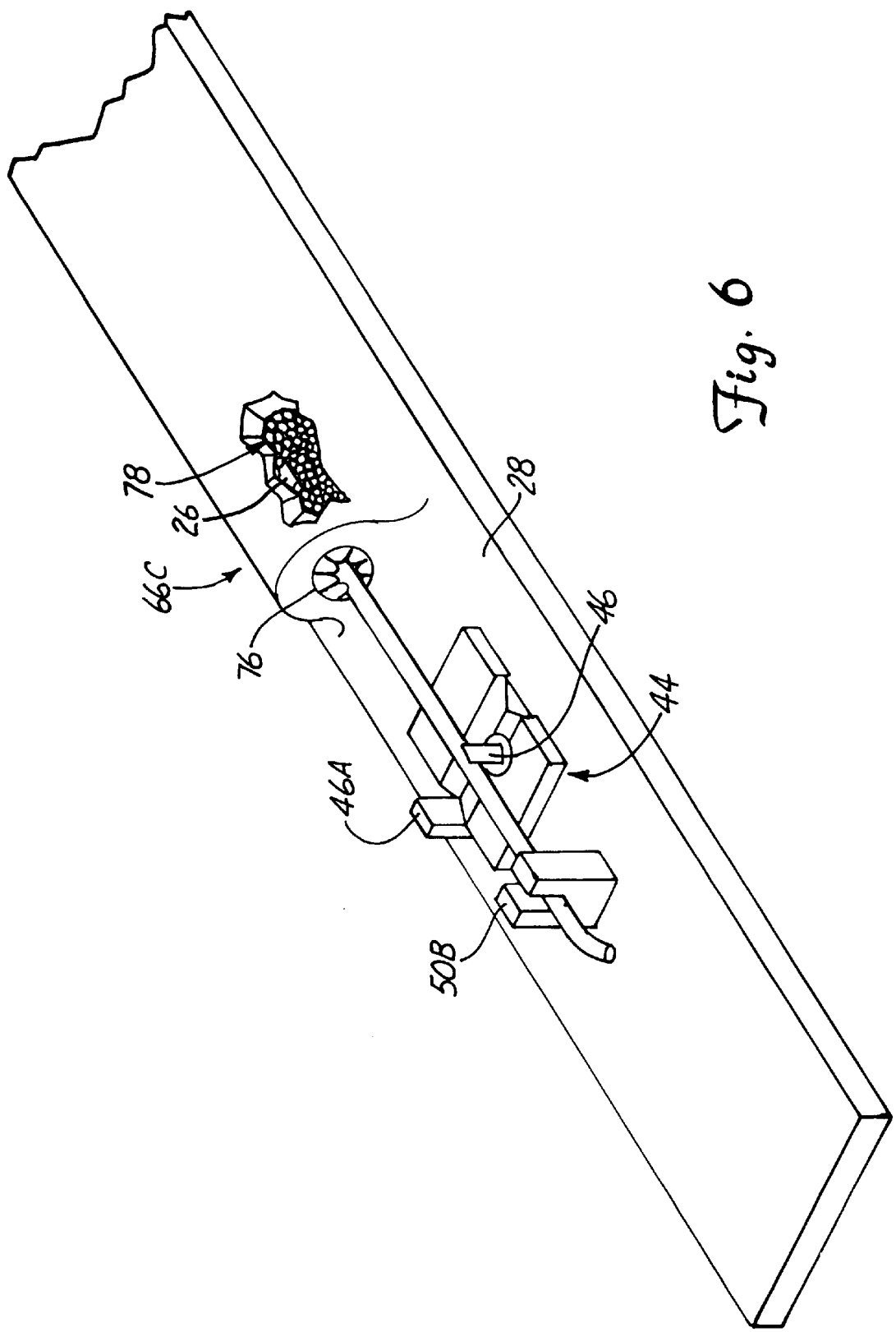

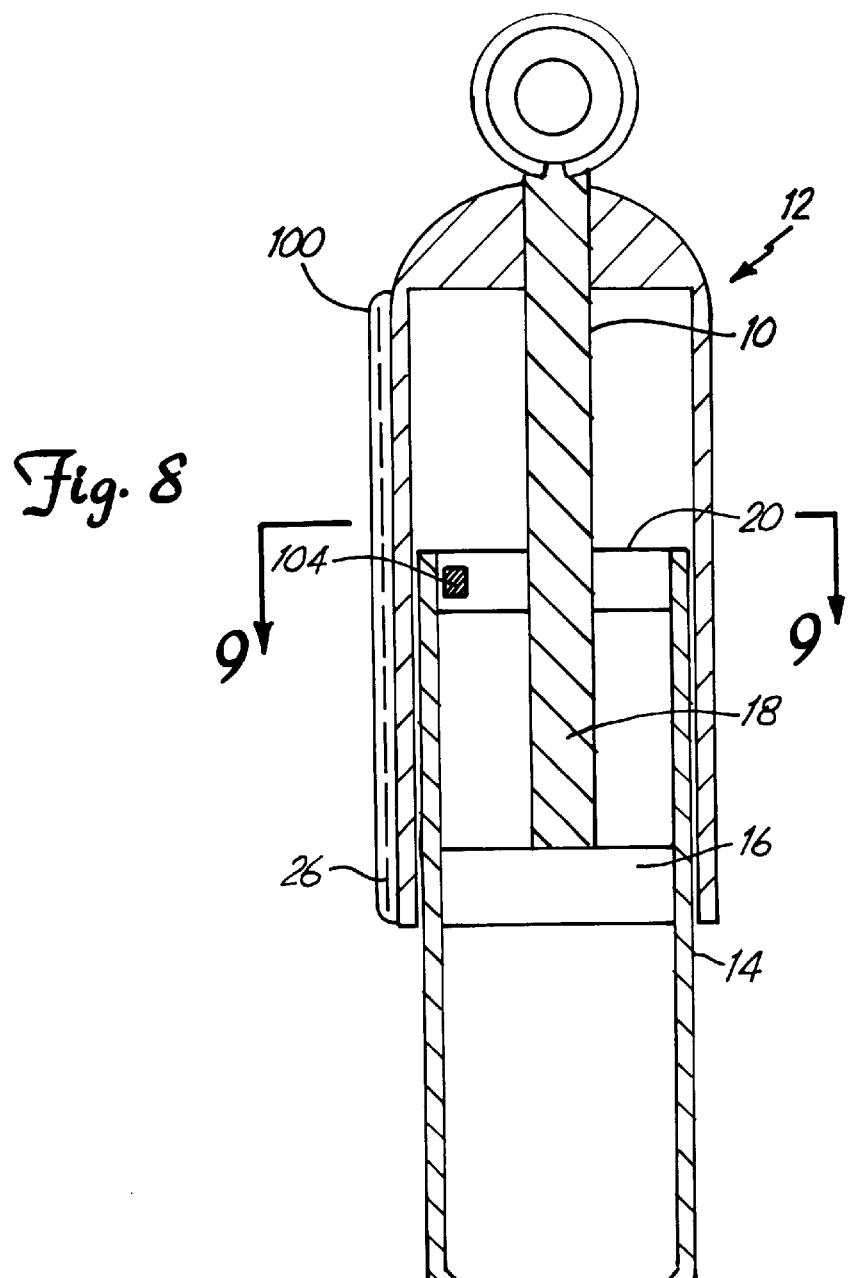
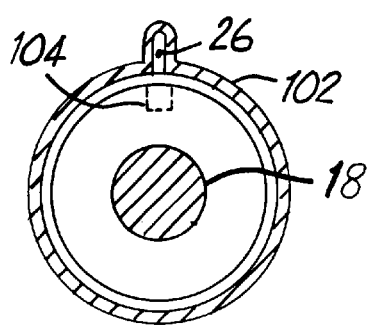

MAGNETOSTRICTIVE LINEAR DISPLACEMENT TRANSDUCER FOR A SHOCK ABSORBER

BACKGROUND OF THE INVENTION

The present application claims the benefit of earlier filed U.S. Provisional Application No. 60/013,985, entitled MAGNETOSTRICTIVE LINEAR DISPLACEMENT TRANSDUCER FOR A SHOCK ABSORBER filed on Mar. 22, 1996.

The present invention relates to a sensor to measure the speed and position of a piston in a cylinder. More particularly, the present invention relates to a magnetostrictive linear displacement transducer for use in a shock absorber.

Various devices have been advanced to measure the distance traveled by a piston in a cylinder. One common application is determining the movement of the piston in a hydraulic, pneumatic or hydro-pneumatic shock absorber, where the piston moves axially in a cylinder filled with at least one damping medium. U.S. Pat. Nos. 4, 502,006; 4,638,670 and 5,233,293 each disclose a displacement sensor to perform this function. As of yet, none of the devices so far advanced have been widely accepted in the automotive industry. Although many systems can accurately measure motion of a piston in a cylinder, a simple transducer that can be easily incorporated into the shock absorber in order to keep manufacturing costs down is still desired by many.

SUMMARY OF THE INVENTION

A shock absorber includes a housing having a chamber and a piston slidably disposed in the chamber. A piston rod is connected to the piston and extends out of the housing. The piston rod includes a bore extending longitudinally therein. A magnetostrictive transducer provides an output signal indicative of the position and/or velocity of the piston with respect to the housing. The magnetostrictive transducer includes a magnetostrictive waveguide disposed in the bore and a magnet joined to the housing that is operably coupled to the magnetostrictive waveguide.

Another aspect of the present invention is a magnetostrictive transducer having a waveguide secured to a support plate at opposite ends of the waveguide. The support plate and the waveguide are disposed in an inner cavity of a housing. In the preferred embodiment, the support plate further includes electrical components and conductive traces to electrically connect the waveguide to an electric circuit that generates electric pulses and provides an output signal corresponding to strain pulses received by a coil assembly also mounted to the support plate. A first damping element is secured to the waveguide and dampens strain pulses not used by the electrical circuit. A second damping element mechanically isolates the waveguide from shock, vibration and contact with the support plate.

BRIEF DESCRIPTION OF THE DRAWINGS

FIG. 3 is a side elevational view of the magnetostrictive transducer with an outer housing removed and a block diagram of an electric circuit.

FIG. 4 is a partial perspective view of a first embodiment of a damping element with a portion removed.

FIG. 6 is a partial perspective view of a third embodiment of a damping element with a portion removed.

FIG. 7 is a sectional view of the magnetostrictive transducer taken along lines 7—7 of FIG. 2.

FIG. 8 is a schematic sectional view of a shock absorber illustrating an alternative position for the magnetostrictive transducer.

FIG. 9 is a sectional view taken along lines 9—9 of FIG. 8.

DETAILED DESCRIPTION OF THE PREFERRED EMBODIMENTS

Figure 1:
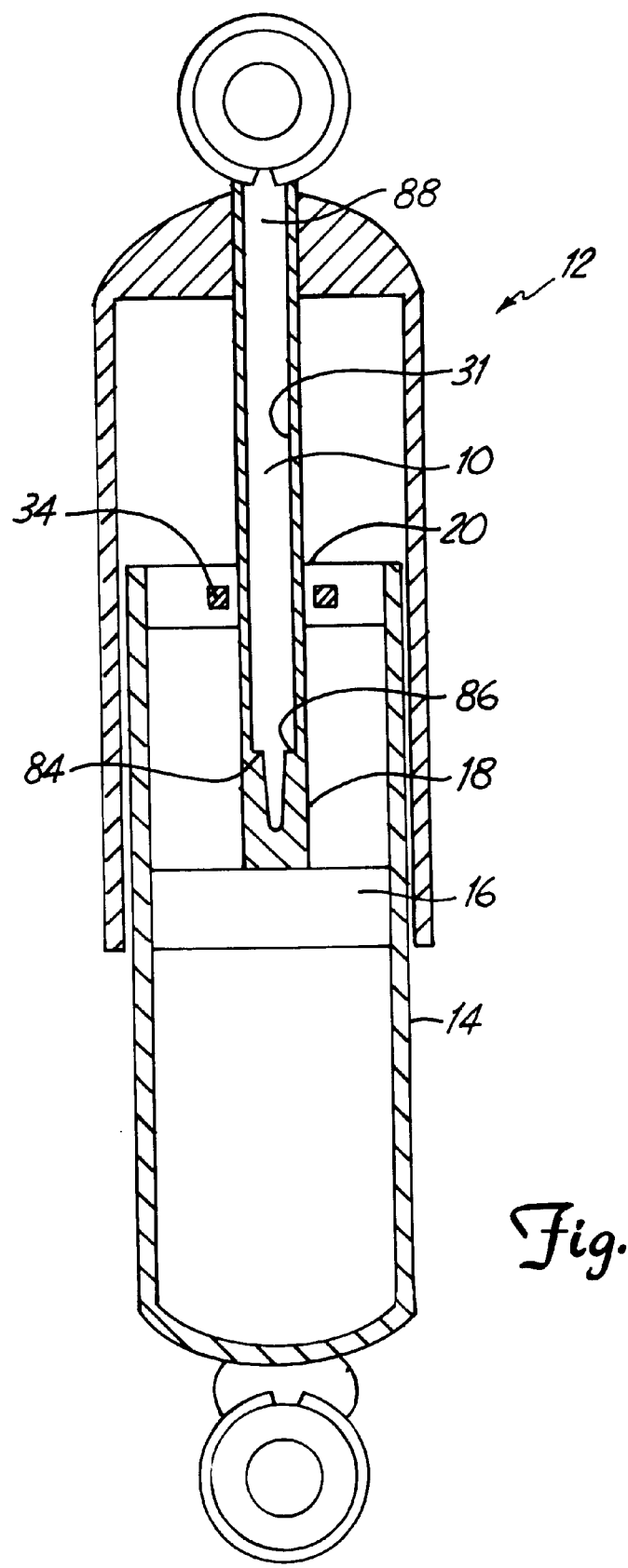
FIG. 1 is a schematic sectional view of a shock absorber having a magnetostrictive transducer of the present invention.

FIG. 1 illustrates a magnetostrictive transducer 10 of the present invention incorporated in a shock absorber illustrated schematically at 12. As is well known, the shock absorber 12 includes a cylinder 14 and a piston 16. A piston rod 18 is secured to the piston 16 and extends through a sealed aperture 20 provided on an end of the cylinder 14. The piston rod 18 connects to a frame member, not shown, of a vehicle, while the cylinder 14 is connected to a frame portion supporting a tire and wheel assembly, also not shown. The shock absorber 12 minimizes acceleration between the frame portions of the vehicle. As will be described below, the magnetostrictive transducer 10 provides a convenient sensor to monitor the position and/or speed of the piston 16 with respect to the cylinder 14.

Figure 2:
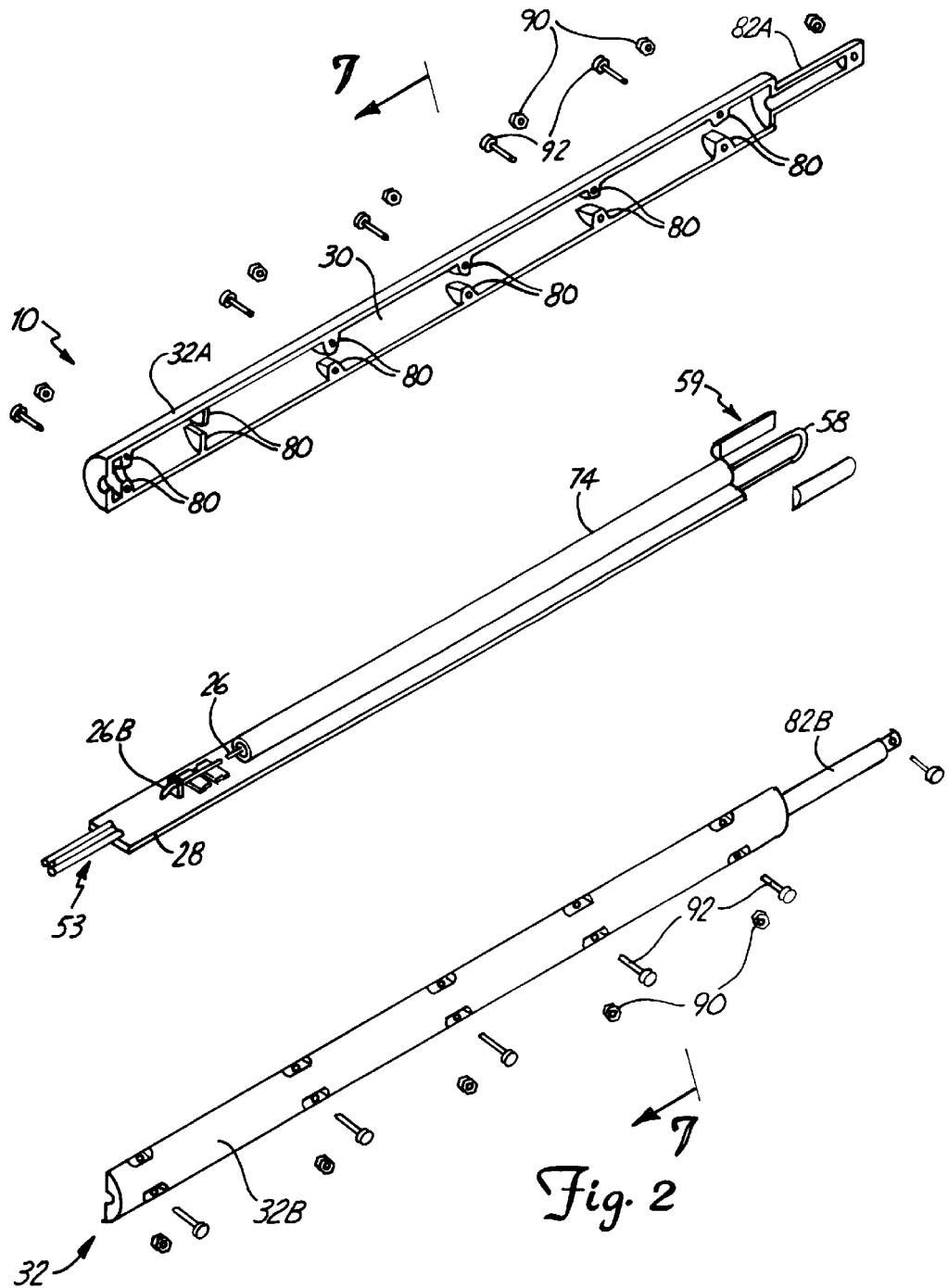
FIG. 2 is an exploded perspective view of the magnetostrictive transducer.
Figure 5:
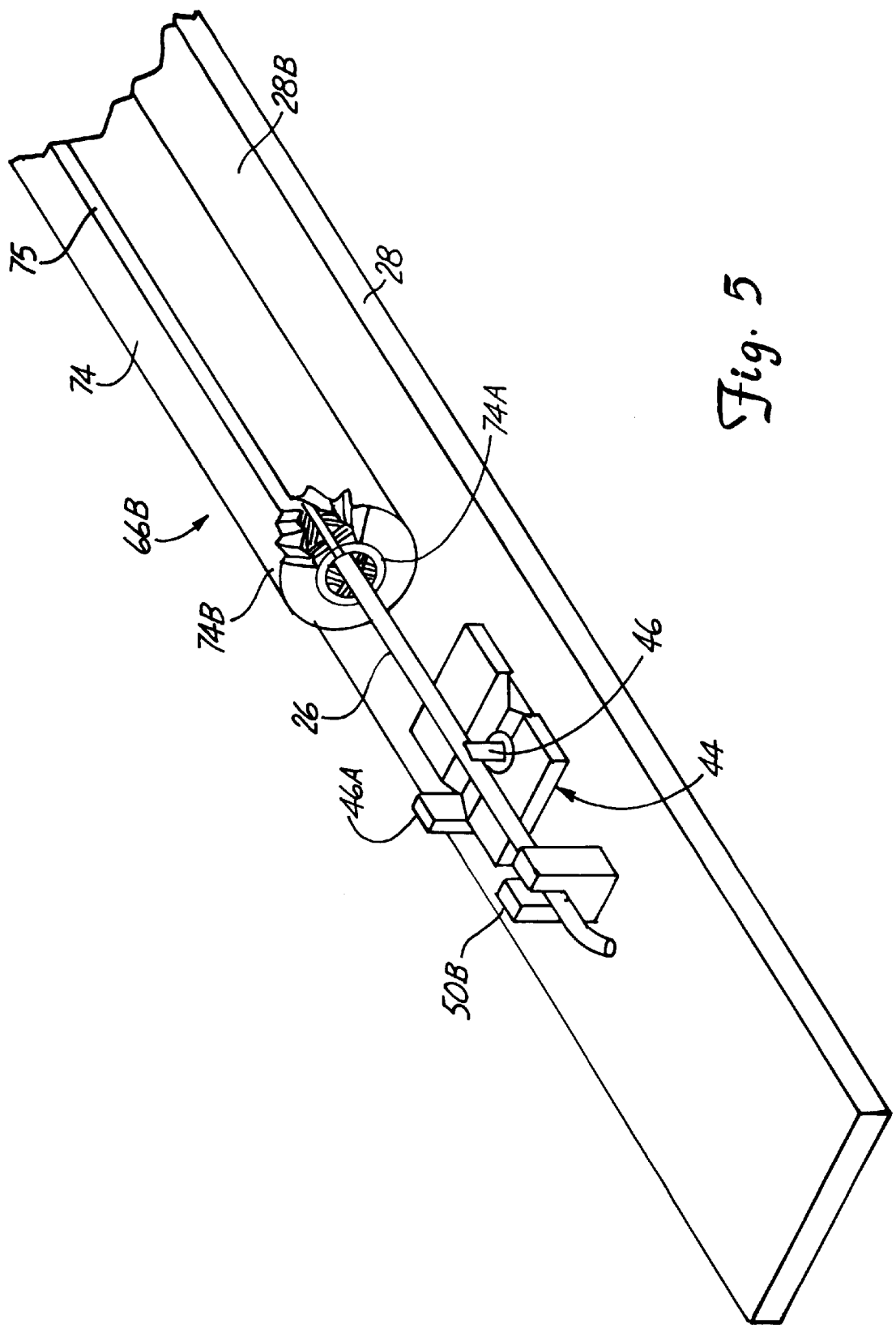
FIG. 5 is a partial perspective view of a second embodiment of a damping element with a portion removed.

Referring also to FIGS. 2 and 3, the magnetostrictive transducer 10 includes a waveguide 26 having ends 26A and 26B that are mounted to a support plate 28. The waveguide 26 and the support plate 28 are secured in an inner cavity 30 of a housing 32 formed from housing portions 32A and 32B. The housing 32 is disposed in a longitudinal bore 31 provided in the piston rod 18. A magnet 34, such as a doughnut magnet, is joined to the cylinder 14 and oriented such that the magnetic field generated by the magnet 34 passes through the piston rod 18, the housing 32 and the waveguide 26. Electric pulses are applied to the waveguide 26 from a pulse generator 36A, forming a portion of an electronic circuit 36. A return line 38 provides a current return path for the waveguide 26 and the circuit 36. The pulse generator 36A provides a stream of electric pulses, each of which is also provided to a signal processing circuit 36B for timing purposes. When the electric pulse is applied to the waveguide 26 with current in a direction indicated by arrow 40, a magnetic field is formed surrounding waveguide 26. Interaction of this field with the magnetic field from the magnet 34 causes a torsional strain wave pulse to be launched in the waveguide 26 in both directions away from the magnet 34. A coil assembly 44 is mounted on the support plate 28. A sensing tape 46 is joined to the waveguide 26 proximate the end 26B and extends into the coil assembly 44. The strain wave causes a dynamic effect in the permeability of the sensing tape 46 which is biased with a permanent magnetic field by magnet 46A (FIGS. 4–6). The dynamic effect in the magnetic field of the coil assembly 44 due to the strain wave pulse, results in an output signal from the coil assembly 44 that is provided to the signal processing circuit 36B along signal lines 39A and 39B. By comparing the time of application of a particular electric pulse and a time of return of a sonic torsional strain wave pulse back along the waveguide 26, the signal processing circuit 36B can calculate a distance of the magnet 34 from the coil assembly 44 or the relative velocity between the waveguide 26 and the magnet 34. The signal processing circuit 36B provides an output signal, either digital or analog, proportional to the calculated distance or velocity.

The waveguide 26 is a solid magnetostrictive alloy that can conduct electric current. A suitable magnetostrictive alloy is a nickel-iron alloy of approximately 30 to 50% nickel. The waveguide 26 is bendable and substantially rigid so that it retains its shape. Preferably, a loop portion 58 is formed in the waveguide 26 and has a 180 degree bend to allow for a smaller diameter section for a "damp" material 59, described below, and for thermal expansion.

Unlike magnetostrictive transducers of the prior art, the magnetostrictive transducer 10 is a compact assembly in that in the preferred embodiment, the support plate 28 further forms a base for the circuit 36. Specifically, components such as resistors, capacitors and integrated circuit devices generally designated at 41 in FIG. 3 for the circuit 36 are conventionally soldered to conductive traces formed on a surface 28A and, if necessary, a surface 28B of the support plate 28. Signal wires 53 provide electric power and transmit the output signal from the signal processing circuit 36B. In the embodiment illustrated, the waveguide 26 is suspended over the surface 28B. Standoffs 50A and 50B support the waveguide 26 and provide an electrical connection to the conductive traces of the circuit 36.

Damping is provided on the waveguide 26 to control propagation of the strain wave pulse and mechanically isolate the waveguide 26 from the shock and vibration. A first damping element is illustrated at 56 in FIG. 3. The damping element 56 controls propagation of one of the strain wave pulses. When the electric pulse forms a magnetic field surrounding the waveguide, interaction of this field with the magnetic field from the magnet 34 causes a torsional strain wave pulse to be launched in the waveguide 26 in both directions away from the magnet 34, a first strain wave pulse propagates down the waveguide 26 toward the coil assembly 44, as described above. However, a second strain wave pulse propagates down the waveguide 26 away from the coil assembly 44. The damping element 56 attenuates or dampens the second strain wave pulse so it is not reflected back by the standoff 50A. Although the standoff 50A is illustrated joined to the support plate 28 on the surface 28A, if desired, the standoffs 50A and 50B can be mounted on the same side of the support plate 28.

The damping element 56 can be a suitable quantity of silicon rubber that is attached to the waveguide 26 as illustrated in FIG. 3 or a two-piece compliant assembly indicated at 59 in FIG. 2. Referring back to FIG. 3, it should be understood that the stroke or active sensing region of the magnetostrictive transducer 10 is defined by a portion of the waveguide 26 extending between the damping element 56 and the coil assembly 44. It should also be understood that the length of the waveguide 26 need not coincide with the longitudinal length of the support plate 28. In other words, the loop portion 58 can extend well beyond an end 28D of the support plate 28. The damping element 56 can be formed along any portion of the loop 58. However, to maximize the stroke of the magnetostrictive transducer 10 and minimize the overall length of the magnetostrictive transducer 10, the damping element 56 is disposed on a remote end 58C of the loop portion 58.

Referring to FIGS. 4–6, three embodiments of a second damping element 66A, 66B and 66C are interposed between the waveguide 26 and the support plate 28 to mechanically isolate the waveguide 26 from shock, vibration and contact with the support board 28. In FIG. 4, the second damping element 66A comprises a strip of material 68 that is suitably adhered to the surface 28B. A surface 68A of the strip of material 68 faces the waveguide 26, and includes compliant projections 70 that lightly contact the waveguide 26 along its length. In this manner, the projections 70 isolate the waveguide 26 from the support plate 28, yet allow strain pulses to propagate along the waveguide 26.

FIGS. 2, 5 and 7 illustrate a second embodiment of the second damping element 66B. In this embodiment, the second damping element 66B comprises a tube 74 extending along the length of the waveguide 26. The tube 74 includes an inner layer 74A and an outer support layer 74B. The inner layer 74A is soft, such as a soft braided material as depicted, that contacts the waveguide 26 in order to provide mechanical isolation. If desired, a longitudinal slit 75 can be provided along the length of the tube 74 through the inner layer 74A and outer support layer 74B. The longitudinal slit 75 allows the tube 74 to be placed around the waveguide 26 after ends 26A and 26B of the waveguide 26 have been attached to the standoffs 50A and 50B. If desired, the tube 74 can be secured to the surface 28B.

A third embodiment of the damping element 66C is illustrated in FIG. 6. In this embodiment, the damping element 66C comprises a suitable material, such as an elastomer film, that can be blown into a bore 76 formed separately and attached, or formed integrally with the support plate 28, as shown. When blown into the bore 76, the material forms air pockets 78 which mechanically isolate the waveguide 26 from inner surfaces of the bore 76. The waveguide 26 can be inserted in the bore 76 prior to or after the material has been blown into the bore 76.

Referring to FIGS. 2 and 7, the housing 32 comprises housing portions 32A and 32B, which when joined together, form the inner cavity 30. Support blocks 80 are formed in an inner surface of each housing portion 32A and 32B to receive edge portions of the support plate 28. If desired, a single continuous recess, not shown, can be provided in each of the housing portions 32A and 32B to replace the spaced-apart support blocks 80. Referring to FIG. 2, each housing portion 32A and 32B includes a reduced diameter portion 82A and 82B, respectively. When joined together, the reduced diameter portions 82A and 82B form a cavity for the loop portion 58. The housing portions 32A and 32B can be joined together using nuts 90 and bolts 92 as illustrated, or integral snaps, now shown, with or without an adhesive. A potting material can be provided in the inner cavity 30 to further secure the support plate 28 in place.

Referring back to FIG. 1, the reduced diameter portions 82A and 82B form an annular surface 84 that contacts a shoulder 86 provided in the piston rod 18. A suitable end cap, such as a threaded nut 88, is provided on an end of the piston rod 18 to hold the magnetostrictive transducer 10 in place.

FIGS. 8 and 9 illustrate an alternative position for a magnetostrictive transducer 100. The magnetostrictive transducer 100 is similar to the transducer 10 described above having a having the waveguide 26. In this embodiment, the magnetostrictive transducer 100 is attached to or formed integrally with an outer housing 102 of the shock absorber 12. The outer housing 102 is rigidly attached to the piston rod 18. A permanent magnet 104 is joined to the cylinder 14 and oriented such that the magnetic field generated by the magnet 104 passes through the waveguide 26. Although illustrated being formed on an outer surface of the outer housing 102, it should be understood that the magnetostrictive transducer 100 can be formed on an inner surface of the outer housing 104 or formed completely within the wall of the outer housing 104.

Although the present invention has been described with reference to preferred embodiments, workers skilled in the art will recognize that changes may be made in form and detail without departing from the spirit and scope of the invention.

What is claimed is:

1. A shock absorber comprising:
   a housing having a chamber;
   a piston slidably disposed in the chamber;
   a rod connected to the piston and extending out of the housing, the rod having a bore extending longitudinally therein; and
   a magnetostrictive transducer comprising:
      a magnetostrictive waveguide disposed in the bore; and
      a magnet joined to the housing and operably coupled to the magnetostrictive waveguide.

2. The shock absorber of claim 1 wherein the magnetostrictive transducer includes a transducer housing disposed in the bore and supporting the magnetostrictive waveguide.

3. The shock absorber of claim 2 wherein the magnetostrictive transducer includes a support plate secured in the transducer housing for supporting the magnetostrictive waveguide.

4. The shock absorber of claim 3 wherein the transducer housing includes a first recess adapted to receive a first edge portion of the support plate and a second recess facing the first recess adapted to receive a second edge portion of the support plate.

5. The shock absorber of claim 4 wherein the transducer housing comprises a first housing portion, and a second housing portion joinable to the first housing portion, wherein the first recess is disposed on the first housing portion and the second recess is disposed on the second housing portion.

6. A magnetostrictive transducer waveguide assembly operable with a magnet, the magnetostrictive transducer waveguide assembly comprising:
   an elongated support plate having spaced-apart opposed ends, longitudinally extending opposed sides and a support surface, the sides of the support plate including edge portions;
   a housing having a first recess adapted to receive a first edge portion of the support plate and a second recess facing the first recess adapted to receive a second edge portion of the support plate in order to support opposed sides of the support plate; and
   a magnetostrictive electrically conductive wire mounted to the support plate.

7. The magnetostrictive transducer waveguide assembly of claim 6 and further comprising electric pulse generating circuit disposed on the support plate and electrically connected to the magnetostrictive electrically conductive wire.

8. The magnetostrictive transducer waveguide assembly of claim 6 and further comprising a coil assembly disposed on the support plate and operably coupled to the magnetostrictive electrically conductive wire.

9. A magnetostrictive transducer waveguide assembly operable with a magnet, the magnetostrictive transducer waveguide assembly comprising:
   a support plate;
   a housing having a first recess adapted to receive a first edge portion of the support plate and a second recess adapted to receive a second edge portion of the support plate; and
   a magnetostrictive electrically conductive wire mounted to the support plate, the magnetostrictive electrically conductive wire including a loop for thermal expansion.

10. The magnetostrictive transducer waveguide assembly of claim 9 wherein a first end of the magnetostrictive electrically conductive wire is supported on a first side of the support plate, a second end is supported on a second side of the support plate and the loop extends over an edge of the support plate.

11. The magnetostrictive transducer waveguide assembly of claim 6 and further comprising a damping element joined to a first portion of the loop and a second portion of the loop.

12. A magnetostrictive transducer waveguide assembly operable with a magnet, the magnetostrictive transducer waveguide assembly comprising:
   a support plate;
   a housing having a first recess adapted to receive a first edge portion of the support plate and a second recess facing the first recess adapted to receive a second edge portion of the support plate; and
   a magnetostrictive electrically conductive wire mounted to the support plate, the magnetostrictive electrically conductive wire including a loop for thermal expansion.

13. The magnetostrictive transducer waveguide assembly of claim 12 wherein the damping element comprises a plurality of compliant projections extending from the support plate to contact the magnetostrictive electrically conductive wire.

14. The magnetostrictive transducer waveguide assembly of claim 12 wherein support plate includes a bore wherein the magnetostrictive electrically conductive wire extends through the bore and the damping element is disposed in the bore.

15. The magnetostrictive transducer waveguide assembly of claim 14 wherein the damping material comprises a braided material.

16. The magnetostrictive transducer waveguide assembly of claim 14 wherein the damping material comprises an elastomer material forming air pockets within the bore.

17. A shock absorber comprising:
   a first housing having a chamber;
   a piston slidably disposed in the chamber;
   a rod connected to the piston and extending out of the first housing;
   a second housing connected to the rod having a recess for receiving the first housing; and
   a magnetostrictive transducer comprising:
      a magnetostrictive waveguide joined to the second housing; and a magnet joined to the first housing and operably
      coupled to the magnetostrictive waveguide.

18. A vehicle suspension strut comprising:
   a housing having a chamber;
   a piston slidably disposed in the chamber;
   a rod connected to the piston and extending out of the housing, the rod having a bore extending longitudinally therein; and
   a magnetostrictive transducer comprising:
      a magnetostrictive waveguide disposed in the bore; and
      a magnet joined to the housing and operably coupled to the magnetostrictive waveguide.

19. The vehicle suspension strut of claim 18 wherein the magnetostrictive transducer includes a transducer housing disposed in the bore and supporting the magnetostrictive waveguide.

20. A vehicle suspension strut comprising:
   a first housing having a chamber;

a piston slidably disposed in the chamber;

a rod connected to the piston and extending out of the first housing;

a second housing connected to the rod having a recess for receiving the first housing; and a magnetostrictive transducer comprising:

a magnetostrictive waveguide joined to the second housing; and a magnet joined to the first housing and operably coupled to the magnetostrictive waveguide.

21. A magnetostrictive transducer waveguide assembly operable with a magnet, the assembly comprising:

an elongated support plate;

a magnetostrictive electrically conductive wire mounted to the support plate; and the support plate including conductive traces to electrically couple the magnetostrictive electrically conductive wire to operating circuitry.

22. The magnetostrictive transducer waveguide assembly of claim 21 wherein the operating circuitry includes a pulse signal generator mounted to the support plate and electrically coupled to conductive traces.

23. The magnetostrictive transducer waveguide assembly of claim 21 wherein the operating circuitry including a coil assembly mounted to the support plate and electrically coupled to conductive traces.

24. The magnetostrictive transducer waveguide assembly of claim 21 wherein the operating circuitry includes a signal processing circuit mounted to the support plate and electrically coupled to conductive traces.

25. The magnetostrictive transducer waveguide assembly of claim 20 wherein the support plate is removable supported in a housing assembly.

* * * * *

UNITED STATES PATENT AND TRADEMARK OFFICE
CERTIFICATE OF CORRECTION

PATENT NO. : 5,952,823
DATED : September 14, 1999
INVENTOR(S) : David S. Nyce

It is certified that error appears in the above-identified patent and that said Letters Patent is hereby corrected as shown below:

Column 5,
Line 49, after "comprising" insert -- an --.

Column 6,
Line 8, replace "6" with -- 9 --.
Line 23, replace "12" with -- 6 and further comprising a damping element disposed longitudinally along the magnetostrictive electrically conductive wire between the support plate and the magnetostrictive electrically conductive wire, --.
Line 28, replace "12" with -- 13 --.
Line 33, replace "material" with -- element --.
Line 36, replace "material" with -- element --.

Column 8,
Line 6, replace "including" with -- includes --.
Line 7, after "and" insert -- is --.
Line 11, after "and" insert -- is --.
Line 14, replace "removable" with -- removably --.

Signed and Sealed this

Eighteenth Day of December, 2001

Attest:

*Attesting Officer*

JAMES E. ROGAN
*Director of the United States Patent and Trademark Office*